United States Patent
Kano et al.

(10) Patent No.: US 8,441,663 B2
(45) Date of Patent: May 14, 2013

(54) APPARATUS INFORMATION OBTAINING APPARATUS, OPERATION INFORMATION PROVIDING APPARATUS, OPERATION INFORMATION PROVIDING METHOD, OPERATION INFORMATION PROVIDING PROGRAM AND THE RECORDING MEDIUM

(75) Inventors: Tomoko Kano, Tokyo (JP); Atsushi Ibaraki, Kanagawa (JP); Kazuhiko Kato, Kanagawa (JP); Hisashi Takata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1817 days.

(21) Appl. No.: 11/226,318

(22) Filed: Sep. 15, 2005

(65) Prior Publication Data

US 2006/0077774 A1    Apr. 13, 2006

(30) Foreign Application Priority Data

Sep. 16, 2004  (JP) ................................ 2004-270321

(51) Int. Cl.
*G06F 3/12* (2006.01)
(52) U.S. Cl.
USPC ....... 358/1.15; 358/1.13; 358/1.14; 358/1.16; 702/35
(58) Field of Classification Search ............. 358/1.15
See application file for complete search history.

(56) References Cited

U.S. PATENT DOCUMENTS

| 7,355,730 | B2* | 4/2008 | Landau et al. ............... 358/1.14 |
| 7,376,725 | B2 | 5/2008 | Takahashi et al. |
| 2002/0143593 | A1 | 10/2002 | Takata et al. |
| 2004/0220779 | A1 | 11/2004 | Fukao |

FOREIGN PATENT DOCUMENTS

| JP | 2001-350878 | 12/2001 |
| JP | 2002-300308 | 10/2002 |
| JP | 2004-94965 | 3/2004 |
| JP | 2004-101545 | 4/2004 |
| JP | 2004-206684 | 7/2004 |
| JP | 2004-234625 | 8/2004 |

* cited by examiner

*Primary Examiner* — Twyler Haskins
*Assistant Examiner* — Brendan McCommas
(74) *Attorney, Agent, or Firm* — Oblon, Spivak, McClelland, Maier & Neustadt, L.L.P.

(57) ABSTRACT

An apparatus information obtaining apparatus for obtaining apparatus information including model information of an image output apparatus from the image output apparatus via a network is disclosed. The apparatus information obtaining apparatus includes: an image output apparatus list database storing a list of image output apparatuses from which the apparatus information is obtained; an apparatus information send instruction sending unit for instructing the image output apparatus included in the image output apparatus list to send the apparatus information; and an apparatus information receiving unit for receiving the apparatus information from the image output apparatus that is instructed to send the apparatus information.

18 Claims, 14 Drawing Sheets

FIG.3

| IMAGE OUTPUT APPARATUS | NETWORK NAME | FLOOR | IP ADDRESS | MANAGER |
|---|---|---|---|---|
| PRINTER A | HELP DESK | 10F | 192.168.1.246 | ABC |
| PRINTER B | IT | 1F | 192.168.1.123 | DEF |

FIG.4

MODEL INFORMATION

| VENDOR NAME | MODEL NAME | MAC ADDRESS | SERIAL NUMBER | NETWORK NAME | FLOOR |
|---|---|---|---|---|---|
| HB | LASER JOT4 | 00-1f-4c-b5-49-64 | 1999-123456 | HELP DESK | 10F |
| KANOM | SOTERO | 00-1f-4c-b5-49-ff | 1985-652365 | IT | 1F |

PRINT NUMBER INFORMATION

| PRINT COUNTER | COPY COUNTER | FAX COUNTER | TOTAL COUNTER | IP ADDRESS | DATE |
|---|---|---|---|---|---|
| 125 | 0 | 0 | 125 | 192.168.1.246 | 2004/9/10 |
| 88 | 0 | 0 | 88 | 192.168.1.123 | 2004/9/10 |

FIG.6

MODEL INFORMATION / SPEC INFORMATION

| VENDOR NAME | MODEL NAME | DEVICE TYPE | TONER TYPE | BW PPM | COLOR PPM |
|---|---|---|---|---|---|
| HB | LASER JOT4 | LASER PRINTER | BW | 10 | - |
| KANOM | SOTERO | LASER PRINTER | COLOR | 10 | 5 |

COST INFORMATION

| COST INFORMATION | | USE START TIME INFORMATION | COST INFORMATION | | | | |
|---|---|---|---|---|---|---|---|
| MAIN UNIT SRP | MAIN UNIT INTERNET PRICE | APPARATUS RELEASE YEAR AND MONTH | CONSUMABLE ITEM INTERNET PRICE(BW) | CONSUMABLE ITEM INTERNET PRICE(COLOR) | 5%TONER COVERAGE YIELD(BW) | 5%TONER COVERAGE YIELD(COLOR) | AVERAGE MONTHLY SERVICE COST |
| $xxx | $xxx | ○○/×× | $xxxx | $xxxx | ○○SHEETS | ××SHEETS | $xx |
| $xxx | $xxx | ○○/×× | $xxxx | $xxxx | ○○SHEETS | ××SHEETS | $xx |

FIG.7

| | MODEL INFORMATION | | | | COST INFORMATION | | | | |
|---|---|---|---|---|---|---|---|---|---|
| VENDOR NAME | MODEL NAME | SERIAL NUMBER | MAIN UNIT PURCHASE PRICE | DEPRECIATION METHOD/ PERIOD | CONSUMABLE ITEM PURCHASE PRICE | TONER COVERAGE YILED(BW) | TONER COVERAGE YILED(COLOR) | AVERAGE MONTHLY SERVICE COST | PURCHASE YEAR/MONTH |
| HB | LASER JOT4 | 1999-123456 | $ ××× | DECLINING-BALANCE METHOD/ 5YEARS | $ ××× | ○○ SHEETS | ×× SHEETS | $ ×× | ○○/×× |
| KANOM | SOTERO | 1985-652365 | $ ××× | DECLINING-BALANCE METHOD/ 5YEARS | $ ××× | ○○ SHEETS | ×× SHEETS | $ ×× | ○○/×× |

FIG.9

| # | Network Location (e.g. Building & Floor) | Network Name (e.g. Dpt.) | Est. or Maturity (mths) | Est. or PPP | Utilization | Vendor | Model Name | PPM | Type ▲ | Toner | Residual Value |
|---|---|---|---|---|---|---|---|---|---|---|---|
| 1 | 10F | Help Desk | 52 | 2.55 ¢ | 1.90% | HB | LaserJot 4 | 10 | Laser Printer | B/W | $35.00 |
| 2 | 1F | IT | 49 | 3.21 ¢ | 2.51% | KANOM | Sotero | 10/5 | Laser Printer | Color | $22.00 |
| 3 | 10F | Training | 81 | 3.26 ¢ | 1.50% | HB | HB LaserJot 5 | 12 | Laser Printer | B/W | $104.40 |
| 4 | 11F | Help Desk | 81 | 2.84 ¢ | 7.76% | HB | HB LaserJot 5 | 12 | Laser Printer | B/W | $104.40 |
| 5 | 11F | Help Desk | 81 | 3.04 ¢ | 2.61% | HB | HB LaserJot 5 | 12 | Laser Printer | B/W | $104.40 |
| 6 | 11F | Help Desk | 81 | 3.30 ¢ | 1.40% | HB | HB LaserJot 5 | 12 | Laser Printer | B/W | $104.40 |
| 7 | 8F | Service | 7 | 12.17 ¢ | 2.52% | HB | HB Color LaserJot 4600 | 17/17 | Laser Printer | Color | $1,296.81 |
| 8 | 1F | IT | 58 | 4.12 ¢ | 7.44% | HB | HB LaserJot 5000 | 16 | Laser Printer | B/W | $134.02 |
| 9 | 1F | IT | 58 | 4.12 ¢ | 7.54% | HB | HB LaserJot 5000 | 16 | Laser Printer | B/W | $134.02 |
| 10 | 1F | IT | 58 | 4.14 ¢ | 6.61% | HB | HB LaserJot 5000 | 16 | Laser Printer | B/W | $134.02 |
| 11 | 1F | IT | 58 | 4.22 ¢ | 4.27% | HB | HB LaserJot 5000 | 16 | Laser Printer | B/W | $134.02 |
| 12 | 1F | IT | 58 | 4.17 ¢ | 5.55% | HB | HB LaserJot 5000 | 16 | Laser Printer | B/W | $134.02 |
| 13 | 1F | IT | 58 | 4.61 ¢ | 1.65% | HB | HB LaserJot 5000 | 16 | Laser Printer | B/W | $134.02 |
| 14 | 1F | IT | 58 | 4.12 ¢ | 7.79% | HB | HB LaserJot 5000 | 16 | Laser Printer | B/W | $134.02 |
| 15 | 1F | IT | 58 | 4.46 ¢ | 2.16% | HB | HB LaserJot 5000 | 16 | Laser Printer | B/W | $134.02 |
| 16 | 1F | IT | 58 | 4.12 ¢ | 7.43% | HB | HB LaserJot 5000 | 16 | Laser Printer | B/W | $134.02 |
| 17 | 5F | Accounting | 58 | 4.21 ¢ | 4.60% | HB | HB LaserJot 5000 | 16 | Laser Printer | B/W | $134.02 |
| 18 | 7F | President Office | 58 | 4.60 ¢ | 1.66% | HB | HB LaserJot 5000 | 16 | Laser Printer | B/W | $134.02 |

EST. OR. MATURITY (YEARS)

EST. OR. PPP (CENTS)

APPARATUS INFORMATION OBTAINING APPARATUS, OPERATION INFORMATION PROVIDING APPARATUS, OPERATION INFORMATION PROVIDING METHOD, OPERATION INFORMATION PROVIDING PROGRAM AND THE RECORDING MEDIUM

BACKGROUND OF THE INVENTION

1. Field of the Invention

The present invention relates to operation information providing apparatus for providing operation information on operation status of an image output apparatus. More specifically, the present invention relates to an operation information providing apparatus, an operation information providing method, an operation information providing program and the recording medium for providing an operating ratio, print cost and the like, and relates for an apparatus information obtaining apparatus for obtaining apparatus information.

2. Description of the Related Art

In recent years, companies make efforts to reduce cost by using the concept of TCO (Total Cost of Ownership) that is a total amount of costs caused by owing apparatuses. For example, as for an image output apparatus such as a copy machine and a printer, the TCO can be calculated by checking the purchase price, a number of copies and the like of the owned image output apparatus and by checking running cost for consumable items such as toner and papers.

As for the number of copies and the like, the data can be collected by visually checking each image output apparatus by the user. In addition, for example, a method is proposed in which information such as the number of copies of the image output apparatus is collected via the Internet (for example, refer to a patent document 1).

[Patent document 1] Japanese Laid-Open Patent Application No. 2004-101545

However, other information necessary for calculating the TCO such as purchase time, purchase price, consumable item price, and maintenance cost of the image output apparatus needs to be checked one by one. Many companies own plural image output apparatuses purchased at different times so that there may be cases where it is not easy even to know the purchase price of each image output apparatus. In addition, depending on the model of the image output apparatuses, toner cartridges may be different so that it is not easy to refer to the price of the consumable item.

Further, even when these information can be obtained, comparison between image output apparatuses cannot be performed unless a calculation method for calculating the TCO is defined based on the obtained information such that the TCO is calculated by using the same calculation method for each image output apparatus. In addition, even though the TCO is calculated, it is difficult how to determine a cost reduction method based on the TCO.

In addition, the greater the number of image output apparatuses a customer owns, the worse such problem becomes. Thus, it is not realistic to calculate TCO and lay out a policy for TCO reduction on image output apparatuses in the customer's side in which there are daily other works.

SUMMARY OF THE INVENTION

The present invention is contrived in view of the above-mentioned problems. An object of the present invention is to provide an apparatus information obtaining apparatus, an operation information providing apparatus, an operation information providing method, an operation information providing program and the recording medium for enabling users to easily manage image output apparatuses from the view point of the TCO.

The abject can be achieved by an apparatus information obtaining apparatus for obtaining apparatus information including model information of an image output apparatus from the image output apparatus via a network, including:

an image output apparatus list database storing a list of image output apparatuses from which the apparatus information is obtained;

an apparatus information send instruction sending unit for instructing the image output apparatus included in the image output apparatus list to send the apparatus information; and an apparatus information receiving unit for receiving the apparatus information from the image output apparatus that is instructed to send the apparatus information.

According to the present invention, the apparatus information obtaining apparatus that enables users to easily manage image output apparatuses from the view point of TCO can be provided.

The object can be also achieved by an operation information providing apparatus for providing operation information on operation status of an image output apparatus based on apparatus information including model information and print number information of the image output apparatus, including:

an apparatus basic information database storing model information and cost information of the image output apparatus;

an apparatus information inputting unit for inputting the apparatus information;

an apparatus basic information extracting unit for extracting cost information of the image output apparatus by referring to the apparatus basic information database using the model information as a key; and an operation cost calculating unit for calculating print cost of the image output apparatus based on the cost information extracted by the apparatus basic information extracting unit and the print number information.

According to the present invention, the operation information providing apparatus that enables users to easily manage image output apparatuses from the view point of TCO can be provided.

The present invention can be also achieved by an operation information providing apparatus for providing operation information on operation status of an image output apparatus connected via a network, including:

an apparatus basic information database storing model information and cost information of the image output apparatus;

an apparatus information obtaining unit for obtaining apparatus information including the model information and print number information from the image output apparatus;

an apparatus basic information extracting unit for extracting the cost information of the image output apparatus by referring to the apparatus basic information database using the model information as a key; and an operation cost calculating unit for calculating print cost of the image output apparatus based on the cost information extracted by the apparatus basic information extracting unit and print number information.

Also the present invention can be configured as a method, a program and a recording medium corresponding to the above-mentioned operation information providing apparatus.

According to the present invention, the apparatus information obtaining apparatus, the operation information providing apparatus, the operation information providing method, the operation information providing program and the recording medium that enable users to easily manage image output apparatuses from the view point of TCO can be provided.

BRIEF DESCRIPTION OF THE DRAWINGS

Other objects, features and advantages of the present invention will become more apparent from the following detailed description when read in conjunction with the accompanying drawings, in which:

FIG. 3 shows an example of an image output apparatus list;

FIG. 4 shows an example of the apparatus information 11 stored in MIB in the image output apparatus;

FIG. 6 shows an example of the apparatus basic information DB;

FIG. 7 shows an example of the customer information DB;

FIG. 9 shows an example of the operation information having a report format;

DETAILED DESCRIPTION OF THE PREFERRED EMBODIMENTS

In the following embodiments of the present invention are described with reference to figures.

First Embodiment

Figure 1:
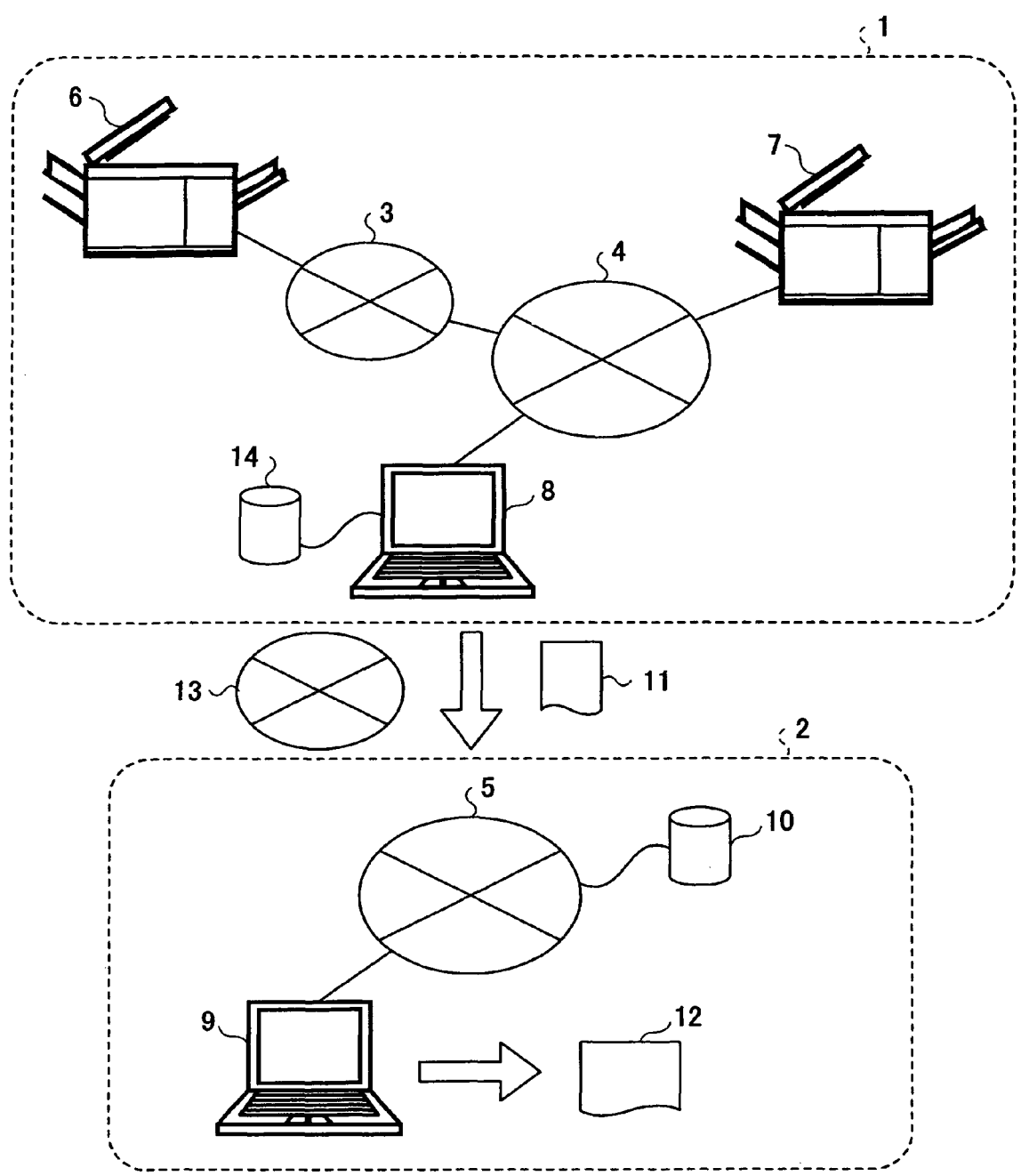
FIG. 1 is a block diagram of an example of an operation information display system for displaying operation information of an image output apparatus.

FIG. 1 shows a block diagram of an example of an operation information displaying system for displaying operation information of image output apparatuses. In this embodiment, apparatus information of the image output apparatus is obtained in the customer's side, and operation information indicating operation status of the image output apparatus is obtained using the obtained apparatus information in the seller's side. An apparatus information obtaining apparatus provided by the seller obtains the apparatus information of the image output apparatus, and provides the customer with operation information provided by an operation information providing apparatus.

In FIG. 1, a system 1 indicates an intra-company network of the customer, and a system 2 indicates an intra-company network of the seller. Apparatus information 11 obtained in the system 1 is passed to the system 2 by a predetermined method. The apparatus information 11 includes various pieces of information owned by the apparatus. Details of the apparatus information 11 are described later. Examples are model information on models of image output apparatuses and print number information on the number of a printed number (number of printed papers).

In the system 1, the apparatus information obtaining apparatus 8 is connected to copy machines 6 and 7 via networks 3 and 4. The apparatus information obtaining apparatus 8 is an apparatus including a function for communicating with the image output apparatus to obtain the apparatus information 11. The apparatus information obtaining apparatus 8 may be a lap top personal computer, for example. The copy machines 6 and 7 are examples of the image output apparatus. The image output apparatus may be any apparatus including an image output function, such as a printer, facsimile and MFP (Multi Functional Printer). The network 3 or 4 is a LAN in the customer's site or a WAN. The apparatus information obtaining apparatus 8 obtains the apparatus information 11 from the image output apparatuses recorded in an image output apparatus list 14.

The apparatus information 11 obtained by the apparatus information obtaining apparatus 8 is supplied to the operation information providing apparatus 9. The seller may collect the apparatus information 11 or collect the apparatus information obtaining apparatus 8 so as to input the apparatus information 11 into the operation information providing apparatus 9. In addition, the apparatus information 11 may be sent to the operation information providing apparatus 9 preferably after performing encryption so as to be input into the operation information providing apparatus 9.

In the system 2, an apparatus basic information DB 10 and the operation information providing apparatus 9 are connected via the network 5. The operation information providing apparatus 9 is a personal computer, for example. The network 5 is a LAN in the seller's site and a WAN. The apparatus basic information DB 10 may be owned by the operation information providing apparatus 9.

Figure 2A:
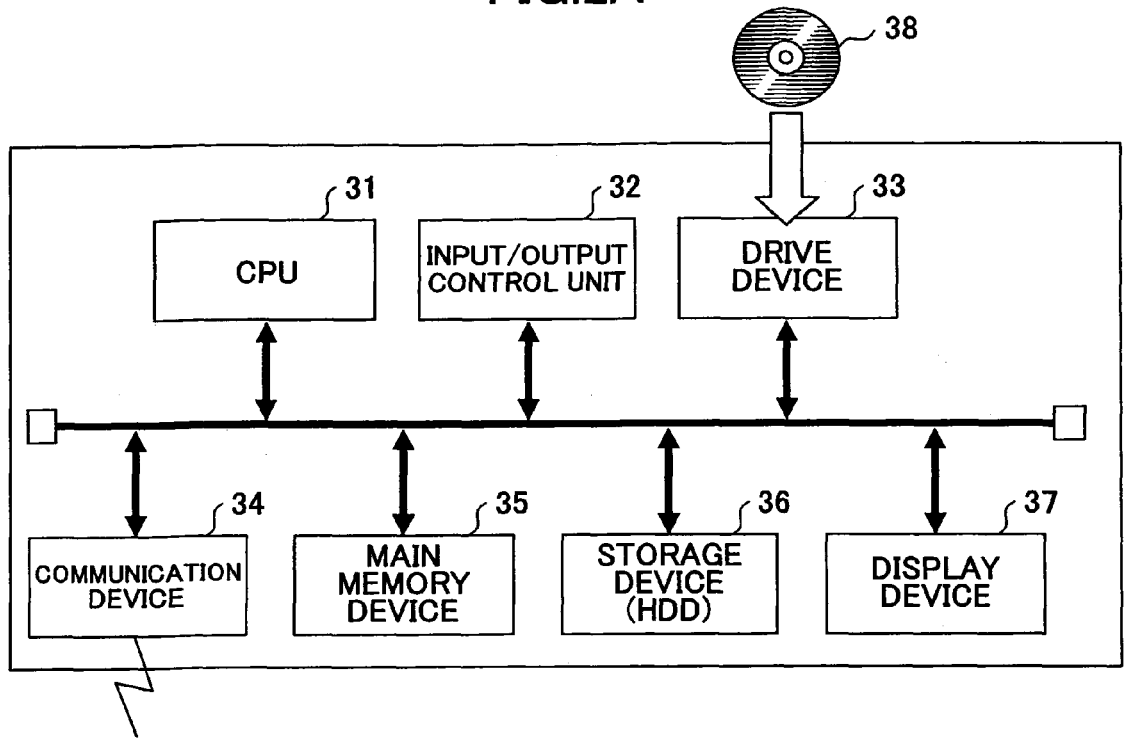
FIG. 2A shows an example of a hardware block diagram of an apparatus information obtaining apparatus.

In the following, the apparatus information obtaining apparatus 8 is described. FIG. 2A shows an example of a hardware block diagram of the apparatus information obtaining apparatus 8. As shown in the figure, the apparatus information obtaining apparatus 8 includes a CPU 31, an input/output device 32, a drive device 33, a communication device 34, a main memory device 35, a storage device 36, and a display device 37 that are connected to a bus 39.

The CPU 31 collectively controls processing performed by the apparatus information obtaining apparatus 8. The input/output device 32 includes a keyboard and a mouse and the like, and is used for inputting various operation instructions from the user. The communication device 34 is an interface for connecting to a network such as the Internet and a LAN, and includes a modem or a router, for example. The main memory device 35 is a memory area for temporarily storing an operating system, programs or data. An apparatus information obtaining program is installed in the storage device 36. A DVD-ROM or a CD-ROM can be inserted into the drive device 33, and the drive device 33 reads programs or data from a recording medium 38, and writes programs or data into the recording medium 38. The display device 37 forms a GUI (Graphical user interface) screen and displays various windows and data necessary for operation.

Figure 2B:
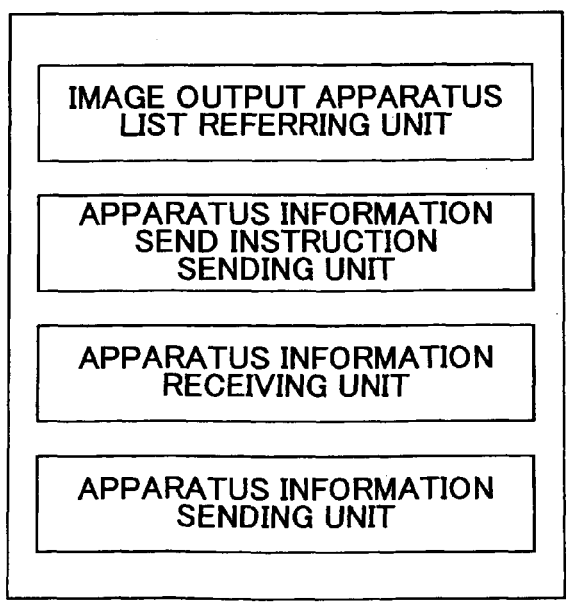
FIG. 2B shows a functional block diagram of the apparatus information obtaining apparatus.

FIG. 2B shows a functional block diagram of the apparatus information obtaining apparatus 8. The apparatus information obtaining apparatus 8 includes an image output apparatus list referring unit, an apparatus information send instruction sending unit, an apparatus information receiving unit, and an apparatus information sending unit.

The image output apparatus list referring unit extracts a list of image output apparatuses from which the apparatus information 11 is obtained by referring to the image output apparatus list 14. As shown in FIG. 1, the image output apparatus list 14 is owned by the apparatus information obtaining apparatus 8. The image output apparatus list 14 is a list in which IP addresses of image output apparatuses from which the apparatus information 11 is obtained are designated. FIG. 3 shows an example of the image output apparatus list 14. The image output apparatus list 14 associates image output apparatuses connected to the network with IP addresses. The network name is a name of the network assigned to the network 3 and the like. The network name can be assigned to each placement location such as floor, or can be assigned to each section in which the apparatus is used.

Referring back to FIG. 2B, the apparatus information send instruction sending unit sends a signal, to each image output apparatus extracted from the list of the image output apparatus, for instructing each image output apparatus to send the apparatus information 11. In addition, the apparatus information receiving unit receives the apparatus information 11 sent from the image output apparatus. When sending the apparatus information 11 to the operation information providing apparatus 9 via the network, the apparatus information sending unit sends the apparatus information 11 received from the apparatus information receiving unit to the operation information providing apparatus 9.

The storage device 36 of the apparatus information obtaining apparatus 8 includes an apparatus information obtaining program that functions a computer as the image output apparatus list referring unit, the apparatus information send instruction sending unit, the apparatus information receiving unit and the apparatus information sending unit. The apparatus information obtaining program can be distributed in a state being stored in a recording medium 36, and is installed in the apparatus information obtaining apparatus via the drive device 33 or the communication device 34.

The apparatus information 11 is described. Each image output apparatus supporting network communication includes information called MIB (Management Information Base) disclosed for reporting self status to the outside. Since the MIB is held by a network apparatus managed by SNMP (Simple Network Management Protocol), the apparatus information obtaining apparatus 8 can obtain information of MIB by the SNMP. Therefore, according to this embodiment, it is preferable that MIB stores the apparatus information 11. The apparatus information obtaining apparatus 8 obtains the apparatus information 11 stored in the MIB using SNMP.

FIG. 4 shows an example of the apparatus information 11 stored in MIB in the image output apparatus. The apparatus information 11 includes, as model information on the model of the image output apparatus, "Vendor Name" indicating a maker of the image output apparatus, "Model Name" indicating a model name, "Mac Address" (Media Access Control address) indicating MAC address and "Serial Number" indicating a serial number of the image output apparatus.

In addition, the apparatus information 11 includes, as print number information on a number of printed papers, "Print Counter" indicating the number of image output papers output by the apparatus as a printer, "Copy Counter" indicating a number of copies output by the apparatus as a copy machine, "Fax Counter" indicating a number of papers output by the apparatus as a facsimile, and "Total Counter" indicating the total sum of these.

Although the apparatus information 11 preferably includes "network name" and "floor" as shown in FIG. 4, these items may be extracted when referring to the image output apparatus list 14 and appended to the apparatus information 11 after obtaining the apparatus information 11.

In addition, the apparatus information 11 stores "IP Address", and "Date" indicating a current date. The apparatus information 11 shown in FIG. 4 is an example, and any other information may be included in FIG. 4.

Figure 5:
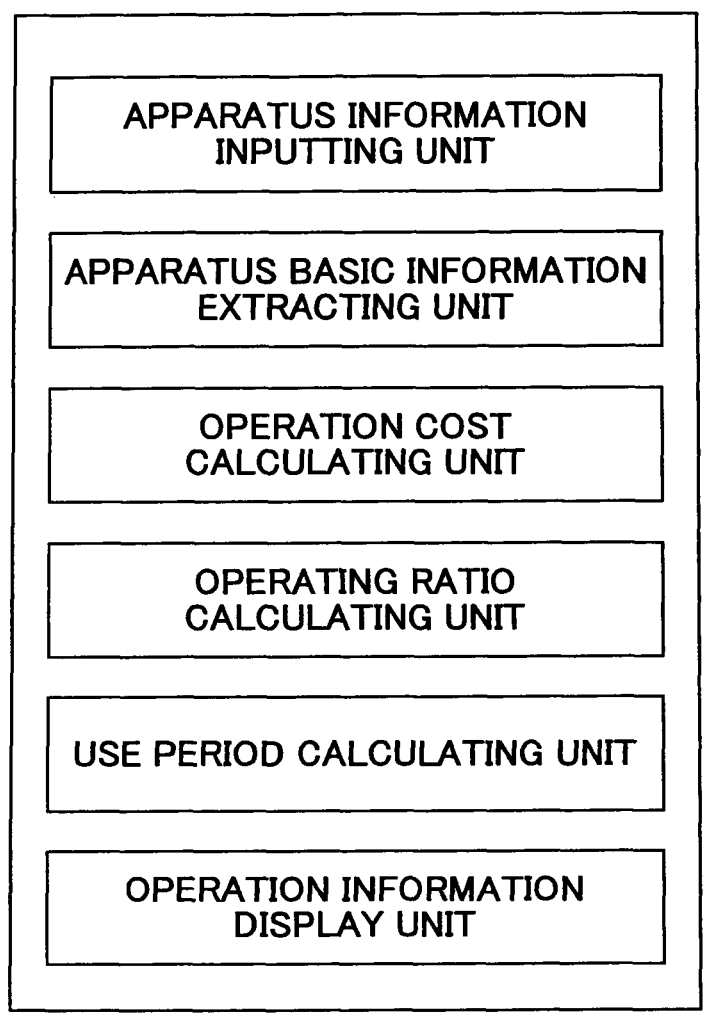
FIG. 5 shows an example of a functional block diagram of the operation information providing apparatus.

In the following, the operation information providing apparatus 9 is described. FIG. 5 shows an example of a functional block diagram of the operation information providing apparatus 9. The hardware configuration of the operation information providing apparatus 9 is the same as that of the apparatus information obtaining apparatus. The operation information providing apparatus 9 includes an apparatus information inputting unit, an apparatus basic information extracting unit, operation cost calculating unit, an operation ratio calculating unit, a use period calculation unit and an operation information displaying unit.

The apparatus information inputting unit supplies the apparatus information 11 to the operation information providing apparatus 9. The apparatus information inputting unit is a drive device 33, for example, and supplies the apparatus information 11 recorded in the CD-ROM or the memory card. When receiving the apparatus information 11 from the apparatus information obtaining apparatus 8 from the network, the apparatus information inputting unit may be a communication apparatus 34.

The apparatus basic information extracting unit refers to an after-mentioned apparatus basic information DB 10 based on the apparatus information 11 to extract cost information, specification information, use start time information and the like of each image output apparatus. The operation cost calculating unit calculates operation cost of each image output apparatus based on the print number information of the apparatus information 11 and extracted expense information or cost information. The operation cost is a print cost per a paper or remaining price, for example. The operation ratio calculating unit calculates an operation ratio indicating frequency of use of the image output apparatus. Details of the calculating method for the operation cost and the operation ratio are described later. The use period calculating unit calculates a period from purchase to the present time (year and month of DATE of the apparatus information 11) based on the purchase year and month or the use start time information of the image output apparatus. The operation information displaying unit displays operation ratio, operation cost and the like in a predetermined form.

An operation information providing program is installed in the storage device 36 of the operation information providing apparatus 9 for causing a computer to execute the apparatus information inputting unit, the apparatus basic information extracting unit, the operation cost calculating unit, the operation ratio calculating unit, the use period calculating unit and the operation information displaying unit. The operation information providing program can be distributed in a state being stored in the storage medium 36, and the program is installed in the operation information providing apparatus 9 via the drive device or the communication apparatus 34.

In the following, the apparatus basic information DB 10 is described. FIG. 6 shows an example of the apparatus basic information DB 10. The apparatus basic information DB 10 includes "Vendor Name" and "Model Name" as model information. The apparatus basic information extracting unit extracts cost information and the like from the apparatus basic information DB 10 using "Vendor Name" and the like as a key.

In addition, the apparatus basic information DB 10 includes "Device Type", "Toner Type", "BW PPM" and "Color PPM" as specification information. The "Device Type" indicates printing device types such as laser printer, inkjet printer, gel ink printer and the like. "Toner Type" indicates a type of toner that is black and white (BW) or color. "BW PPM" indicates print speed in units of PPM (Paper Per Minute) for outputting black and white. "Color PPM" indicates print speed for outputting color.

The apparatus basic information DB 10 includes, as cost information, "Main unit SRP", "Main unit internet price", "Consumable item internet price (BW)", "Consumable item internet price (color)", "5% Toner Coverage Yield (BW or Color)", and "Average monthly service cost".

The "Main unit SRP" indicates a suggested retail price by a maker. In a case of open price, a price of mass merchandisers may be stored. The "main unit internet price" indicates a price for selling via the Internet using a home page of the maker. The "Consumable item internet price (BW)" indicates a general price when purchasing a black toner cartridge via the Internet. The "Consumable item internet price (color)" indicates a general price when purchasing a color toner cartridge via the Internet. The "5% Toner Coverage Yield (BW or Color)" indicates a number of papers that can be printed with one toner cartridge. Since "5%" indicates a ratio of toner use amount to paper surface area, the "5% Toner Coverage Yield (BW or Color)" indicates a number of papers that can be printed with one toner cartridge when printing with about 5% toner use amount. The "Average monthly service cost" is a maintenance cost per month. For example, it indicates a contract price per month for yearly maintenance contract.

In addition, the apparatus basic information DB 10 includes "Apparatus release year and month" as the use start time information. The "apparatus release year and month" indicates year and month of the release of the image output apparatus.

By the way, the apparatus basic information stored in the apparatus basic information DB 10 is generally disclosed. Therefore, by referring to the apparatus basic information DB 10, operation information can be calculated. However, since "Apparatus release year and month" is an item for calculating a use period, it is preferable to store actual year and month of customer's purchase. In addition, since the cost information is an item for calculating expense of the customer for the image output apparatus, it is preferable that the cost information is an actual main unit price or an actual consumable item price when the customer bought them. Therefore, it is preferable that the seller has a user information DB (to be referred to as customer information DB hereinafter) that stores actual purchase year and month and expense information for each image output apparatus for each customer.

FIG. 7 shows an example of the customer information DB. The customer information DB stores, for each customer and for each image output apparatus, customer information specific to the customer, such as "Main unit purchase price", "Depreciation method/period", "Purchase price of consumable item", "Toner Coverage Yield", "Monthly service cost", and "Purchase year and month". The "Vendor Name", "Model Name" and "Serial Number" are model information for identifying a machine. The "Main unit purchase price" indicates actual purchase price of the image output apparatus, the "Depreciation method/period" indicates a method of depreciation (declining-balance method or straight-line method or the like) and a period of depreciation. The "Purchase price of consumable item" indicates an actual purchase price of toner cartridge and papers and the like. The "Toner Coverage Yield" indicates a number of papers to be printed per one cartridge with normal toner use amount by the customer. The "Monthly service cost" indicates actual cost of maintenance contract per one month. The customer information DB may be connected to the network 5 like the apparatus basic information DB 10, or may be included in the operation information providing apparatus 9.

Therefore, as to an image output apparatus for which expense information or purchase year and month is stored in the customer information DB, the operation information providing apparatus 9 uses the customer specific value stored in the customer information DB by priority. As to an image output apparatus for which the customer specific value is not stored in the customer information DB, the operation information providing apparatus 9 uses a value in the apparatus basic information DB 10 to calculate the operation cost and the like.

The calculated operation information such as the operation cost and the operation ratio is displayed as a format such as a graph and a report by the operation information displaying unit. Irrespective of displayed format or output format, the operation information 12 is referred to as all information on image output apparatuses extracted or calculated based on the apparatus information 11, the customer information DB and the apparatus basic information DB 10.

Figure 8:
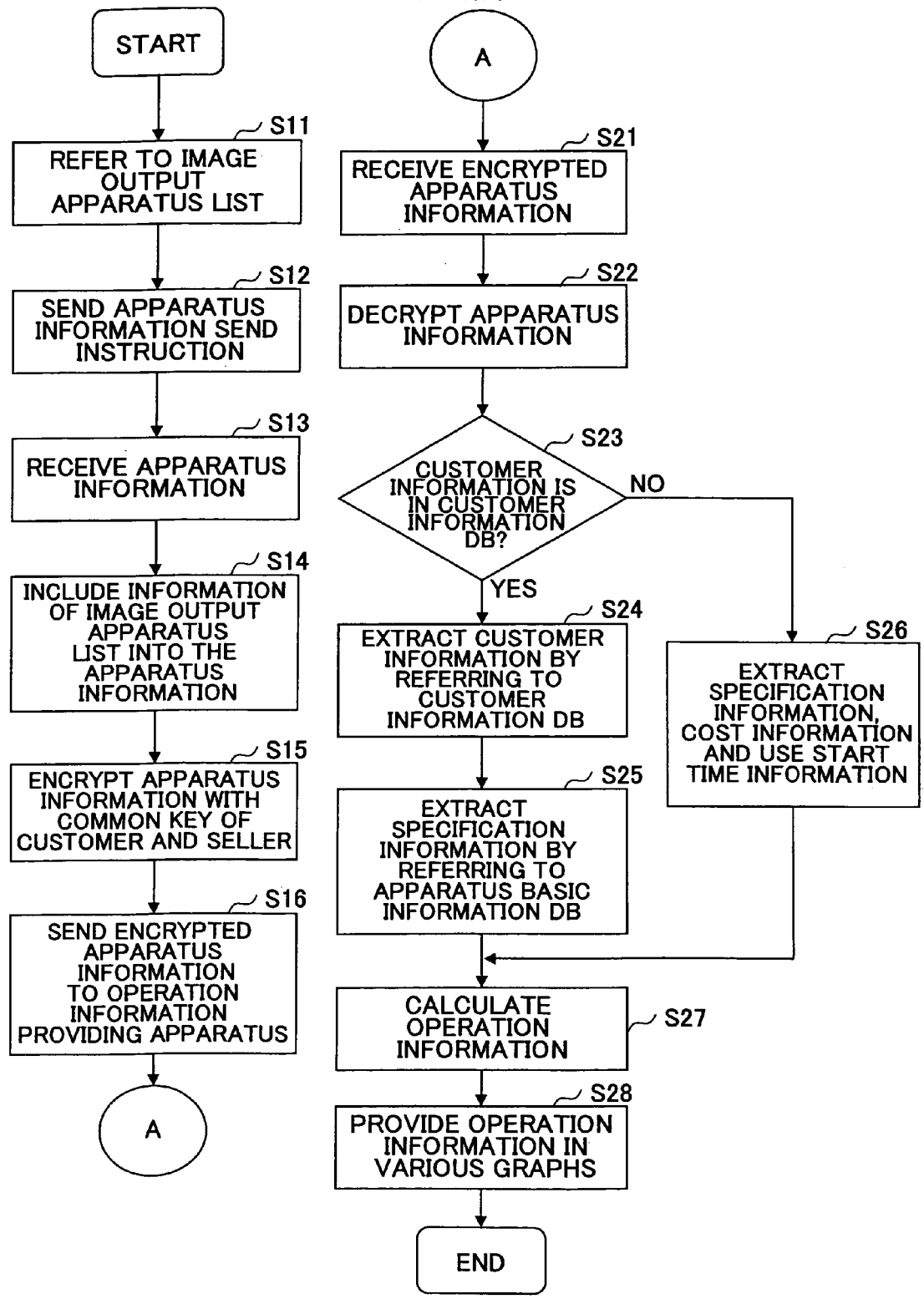
FIG. 8 is a flowchart indicating a process procedure from the time when the apparatus information obtaining apparatus 8 obtains the apparatus information to the time when the operation information providing apparatus 9 obtains the operation information.

FIG. 8 is a flowchart indicating a process procedure from the time when the apparatus information obtaining apparatus 8 obtains the apparatus information to the time when the operation information providing apparatus 9 obtains the operation information. It is preferable that the process is periodically performed at predetermined timing such as once a month, for example.

At a predetermined timing or in response to a start instruction of processing, the image output apparatus list referring unit refers to the image output apparatus list 14 to extract an IP address of an image output apparatus from which apparatus information is obtained in step S11. When the IP address is extracted, the apparatus information send instruction sending unit sends an apparatus information send instruction to the image output apparatus of the IP address in step S12. The image output apparatus that receives the apparatus information send instruction extracts the apparatus information corresponding to the send instruction from MIB to send it to the apparatus information providing apparatus 8.

The apparatus information receiving unit receives the apparatus information from each image output apparatus in step S13. The apparatus information obtaining apparatus 8 extracts placement location information such as network name and floor from the image output apparatus list 14 and the information is added to the apparatus information 11 in step S14. Accordingly, the apparatus information 11 shown in FIG. 4 is generated.

The apparatus information obtaining apparatus 8 may send the apparatus information 11 as it is to the operation information providing apparatus 9, or may encrypt the apparatus information to improve security in step S15. Although encryption can be performed by any method, the common key method is used in this embodiment. The common key is provided by the customer and is stored in the apparatus information obtaining apparatus 8 and the operation information providing apparatus 9 beforehand. By performing encryption, it can be avoided that a third party taps the apparatus information. In addition, the customer can pass the common key to a seller having a relationship of trust. The encrypted apparatus information is sent to the operation information providing apparatus 9 by the apparatus information sending unit in step S16. As mentioned above, the seller may collect the apparatus information 11 to input it to the operation information providing apparatus 9.

Next, processing of the operation information providing apparatus 9 is described. First, the apparatus information receiving unit receives the encrypted apparatus information in step S21. Since the operation information providing apparatus 9 has the common key, the operation information providing apparatus 9 decrypts the apparatus information with the common key in step S22.

Next, the apparatus basic information extracting unit determines whether customer information of the image output apparatus is stored in the customer information DB using the serial number and the like as a key in step S23. When the customer information exists in the customer information DB (Y in step S23), the purchase year and month, and the expense information are extracted in step S24. Next, the apparatus basic information DB 10 is referred to, and specification information such as the print speed and the like is extracted using model information as a key in step S25.

When the customer information of the image output apparatus does not exist in the customer information DB (N in step S23), the operation information providing apparatus 9 refers to the apparatus basic information DB 10 to extract specification information such as the print speed of the image output apparatus, cost information and the use start time information using model information in the apparatus information 11 as a key in step S26.

After the specification information, expense information or cost information, and, purchase year and month or use start time information are extracted, the operation cost calculating unit calculates operation cost based on the print number information in the apparatus information 11 and the expense information or cost information. The operation ratio calculating unit calculates the operation ratio of the image output apparatus based on the print number information of the apparatus information 11 and the printing speed, and the use period calculating unit calculates the use period based on Date of the apparatus information 11 and purchase year and month or use start time information use period in step S27. Details of the calculation are described later.

The calculation result is visually displayed in various forms described next by the operation information providing unit in step S28. The visualized operation information 12 may be converted into a file such as PDF (Portable Document File) to be sent to the apparatus information obtaining apparatus 8 via the network 13. The sent operation information 12 is output by a predetermined image output apparatus.

FIG. 9 shows an example of the operation information 12 having a report format. The model information and the like stored in the apparatus information 11 or the apparatus basic information DB 10 is extracted as it is. As to other items "Est. Or Maturity (use period)", "Est. Or PPP (print cost per one page)", "Utilization (operation ratio)" and "Residual Value" are obtained by calculation corresponding to step S27 in FIG. 8.

The "Est. Or Maturity (Mnths)" indicates estimation of use period in units of months. For example, when the "Est. Or Maturity (Mnths)" is 60 Mnths, it indicates that the apparatus has been used for five years. The use period is calculated based on "Purchase year and month" extracted from the customer information DB or "Machine sold year and month" extracted from the apparatus basic information DB 10. When using the "Machine sold year and month", the use period is calculated by multiplying a use period from "Machine release year and month" to a year and month indicated by Date of the apparatus information by a predetermined ratio (0.8, for example). The "Est.Or PPP" indicates an estimation of print cost per one page. The print cost per one page for the toner can be obtained by dividing the "Consumable item purchase price" in the customer information DB by "Toner Coverage Yield", or by dividing "Consumable item internet price (BW)" by "5% Toner Coverrage Yield(BW)". A price of a paper may be added to the "Est.Or PPP".

The "Utilization" indicates an operation ratio. The operation ratio is calculated by dividing a number of printed papers per month by a number of papers that the image output apparatus can print per month. The number of output papers per month can be calculated from "Total Counter" extracted from the apparatus information 11. In addition, the number of papers that the image output apparatus can print per month can be calculated by multiplying operation available time (7 hours per day×20 days) per month by "BW PPM or (Color PPM)×60" that is print speed per one hour.

For example, as to an image output apparatus in which BW PPM is 30, the largest number of printed papers that can be output per month is 30 PPM×60 minutes×7 hours×20 days. Therefore, when the number of printed papers per month is 5040, the operation ratio is 2.0%.

The "Residual Value" indicates a residual value after depreciation. If the depreciation method and depreciation period are known, the residual value can be calculated based on the use period (Est.Or Maturity) and the purchase price of the main unit. When the depreciation method and depreciation period are not stored in the customer information DB, the "Residual Value" is calculated using general depreciation method and period.

Figure 10A:
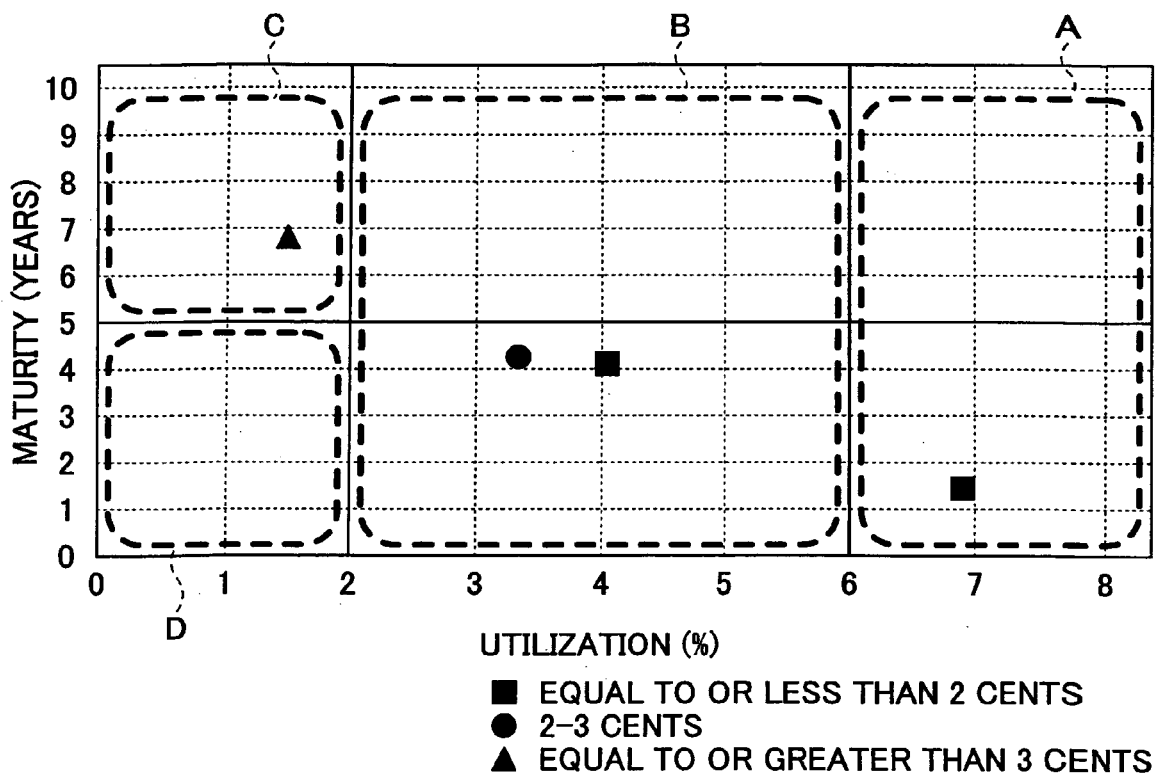
FIG. 10A shows an example of the operation information of a graph format.

Next, display forms in which the operation information displaying unit displays the operation information 12 are described. FIG. 10A shows an example of the operation information 12 shown as a graph format. The graph shown in FIG. 10A shows relationship between operation ratio (X axis) and use period (Y axis) for each image output apparatus. In the figure, lines are drawn at each of operation ratios 2% and 6%, and a line is drawn at use period of 5 years, so that the graph is divided into several regions.

For example, since an operation ratio (use frequency) of the image output apparatus that is plotted at a region A is high, measures are taken for decreasing the user frequency in consideration of waiting time and the like. For example, one more printer is placed near the image output apparatus, or the image output apparatus is replaced with another image output apparatus having larger PPM, so that the operation ratio is decreased and the image output apparatus is plotted at a region B in which it can be estimated that a proper operation ratio is obtained.

In addition, an operation ratio of the image output apparatus plotted at a region c is low and the use period is long. That is, it can be estimated that the image output apparatus is not used since the image output apparatus becomes too old for work so that the print speed becomes low and the usability becomes worse. Therefore, measures such as recycling are taken, for example.

In addition, the operation ratio of the image output apparatus plotted at a region D is low and the use period is short. The fact that the image output apparatus is plotted at the region D means that the use frequency is low even though performance such as PPM and consumed power is good. Thus, measures are taken for changing location of the image output apparatus to another location of a section in which use frequency of the image output apparatus is higher. Accordingly, the operation ratio of the image output apparatus plotted at the region D increases, so that the plotted region is changed to the region B in which it can be estimated that a proper operation ratio is obtained.

The method for dividing the graph into regions A-D can be changed based on use waiting time of the image output apparatus, the "Residual Value", life expectancy, and use frequency considered to be proper. Therefore, measures suitable for the customer's use method can be taken.

In addition, the shape of a plot mark is determined according to "Est.Or PPP" in FIG. 10A. More particularly, the plot mark is a quadrilateral when "Est.Or PPP" is equal to or less that two cents, the plot mark is a circle when "Est.Or PPP" is 2-3 cents, and the plot mark is a triangle when "Est.Or PPP" is equal to or greater than three cents. By using such plot marks, when an image output apparatus having high "Est.Or PPP" is plotted in the region B that is a proper region, for example, better measures can be taken such as for decreasing the operation ratio.

Figure 10B:
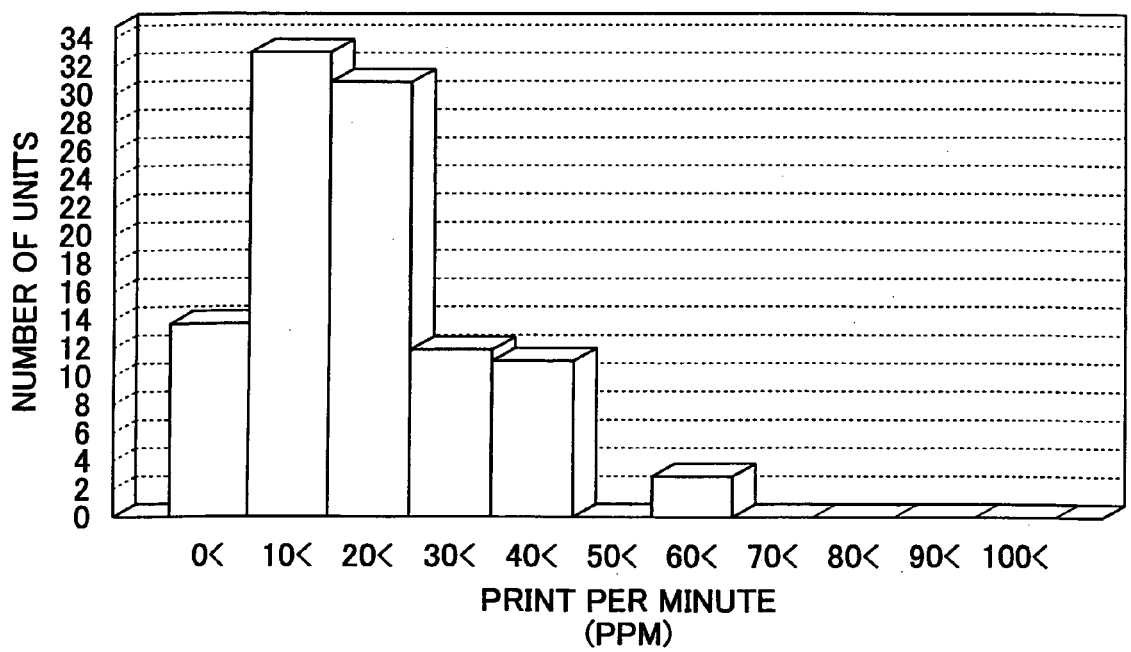
FIG. 10B shows an example of the operation information of a graph format.

FIG. 10B shows another example of operation information 12 in a graph format. The graph shown in FIG. 10B indicates a number (Y axis) of image output apparatuses owned by the customer for each PPM (X axis). By using the graph shown in FIG. 10B, the number of image output apparatuses can be ascertained for each print speed. In consideration of placement space, compared with a case in which one owns plural image output apparatus having low printing speed, there may be a cost advantage when one owns only one image output apparatus having high print speed. In addition, there may be a case in which managing consumable items of plural or many kinds of image output apparatuses causes high cost. Therefore, by displaying the operation information 12 as shown in FIG. 10B to replace the image output apparatus, proper relationship between the print speed and the number of image output apparatuses can be kept. Especially, it is effective when a company or an office becomes large so that the number of owned image output apparatuses increases.

Figure 11A:
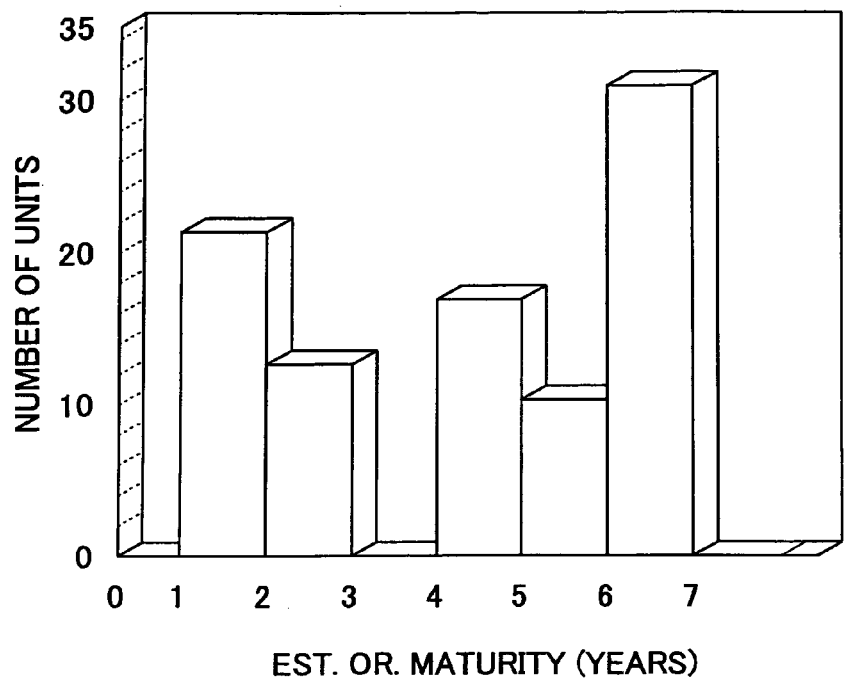
FIG. 11A shows an example of the operation information of a graph format.

FIG. 11A shows another example of the operation information 12 in a graph format. The graph shown in FIG. 11A indicates a number (Y axis) of image output apparatuses owned by a customer for each "Est.Or Maturity" (X axis). It can be estimated that an image output apparatus that has been used for a long time will need to be replaced in the near future. For example, when there are plural image output apparatuses having similar used period near the life period, it can be estimated that replacement occurs at one time for the image output apparatuses. By referring to the graph shown in FIG. 11A, the seller or the customer can perform replacement of image output apparatuses in stages, and can allocate expenditures beforehand, for example. In addition, by referring to the graphs shown in FIGS. 10A and 10B, a print speed (PPM) and a placement location of an image output apparatus to be newly purchased can be determined beforehand.

Figure 11B:
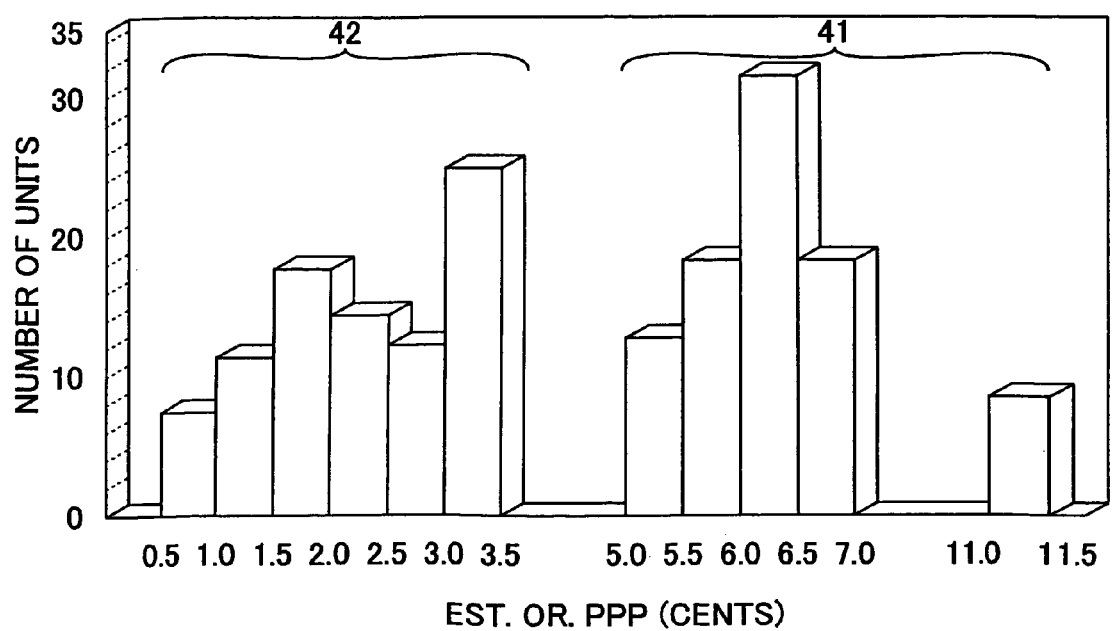
FIG. 11B shows an example of the operation information of a graph format.

FIG. 11B shows another example of the operation information 12 in a graph format. The graph of FIG. 11B indicates a number (Y axis) of the image output apparatuses owned by the customer for each "Est.Or PPP" (X axis). According to FIG. 11B, the number of image output apparatuses having high print cost can be ascertained. The print cost becomes high when the price of the consumable item is high or when the Toner Coverage is high. Therefore, when the print cost is high, the customer can investigate the cause so that the print cost can be decreased. In addition, by replacing the image output apparatus having the high print cost with another image output apparatus, the print cost can be decreased.

In addition, FIG. 11B can display a graph for black and white image output apparatuses and a graph for color image output apparatuses separately. In FIG. 11B, a block 41 mainly shows the number of color image output apparatuses and a block 42 mainly shows the number of black and white image output apparatuses. That is, the color image output apparatus has a tendency causing high print cost, and the print cost can be ascertained more properly by displaying the color image output apparatuses and the black and white image output apparatuses separately. For example, when the number of color image output apparatuses of high print cost is relatively large, by decreasing the print cost of the color image output apparatuses, print cost can be decreased efficiently as a whole. In addition, when the number of the black and white image output apparatuses is counted at the block 41, by separating the color image output apparatuses, and the black and white image output apparatuses, black and white image output apparatuses having high print cost can be ascertained.

Figure 12A:
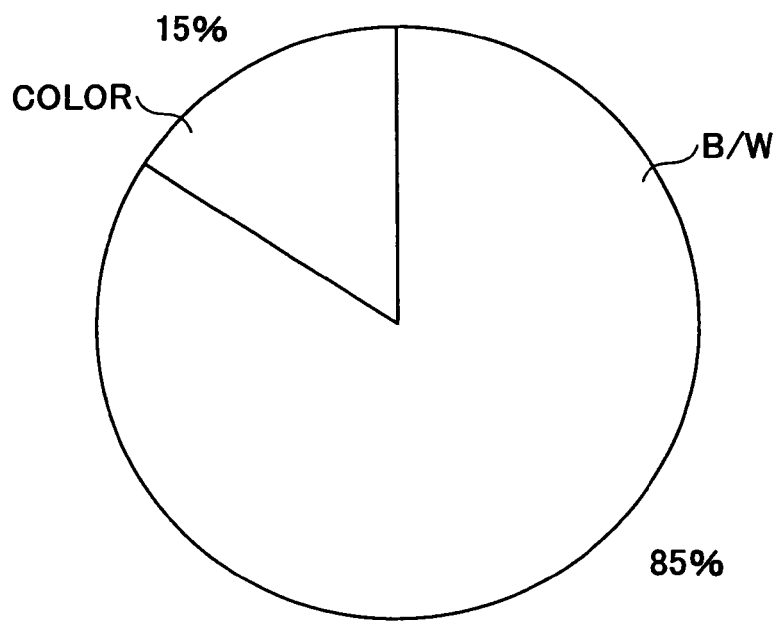
FIG. 12A shows an example of the operation information of a graph format.

FIG. 12A shows another example of the operation information 12 in a graph format. The graph of FIG. 12A shows a number ratio between the black and white image output apparatuses and the color image output apparatuses using a circle graph. From the FIG. 12A, it can be easily ascertained that the ratio of color image output apparatuses to owned image output apparatuses. Since frequency of use of the color image output apparatus is small in daily works and since initial investment cost and running cost for the color image output apparatus are large, decrease of TCO becomes difficult if the ratio of the color image output apparatuses is large. The customer can ascertain a proper ratio of color image output apparatuses by referring to the graph of FIG. 12A. In addition, the seller can provide a new image output apparatus based on the proper ratio of the color image output apparatuses.

Figure 12B:
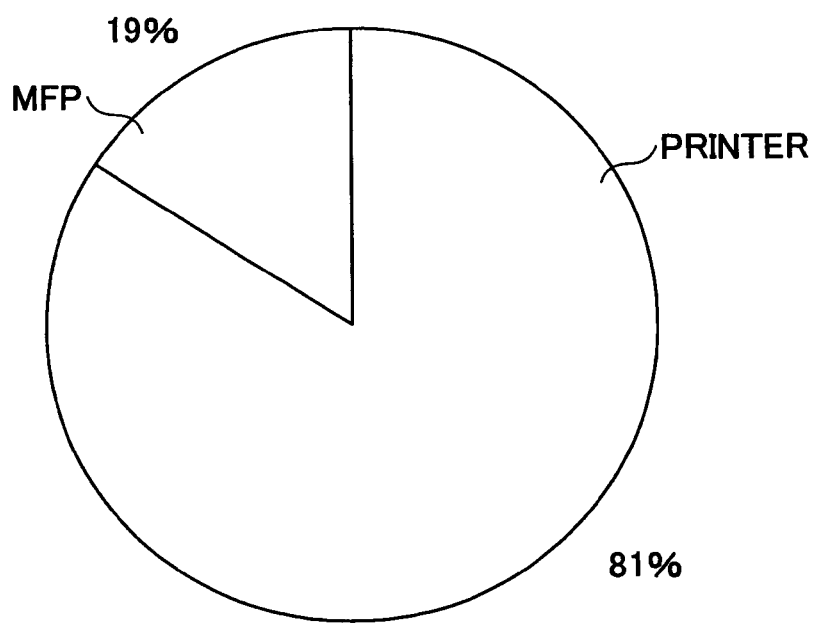
FIG. 12B shows an example of the operation information of a graph format.

FIG. 12B shows another example of the operation information 12 in a graph format. The graph in FIG. 12B shows a number ratio between printers and MFPs using a circle graph. Since the MFP includes a printing function like a printer, a printer can be replaced with a MFP. By replacing plural printers with one MFP, the placement space for the printers can be utilized for other purposes. By referring to the graph of FIG. 12B, the customer can ascertain the ratio of MFPs. In addition, the seller can provide a new image output apparatus based on the ratio of the MFPs. Especially, when many inkjet printers are used for color printing, the effect of space reduction can be remarkably obtained by replacing the inkjet printers with one color image output apparatus.

As mentioned above, by visually displaying the operation information 12, handling of the operation information for which interpretation is generally difficult becomes easy. The seller can provide the operation information 12 in an easily-understandable format to customers who are unfamiliar with MIB information, apparatus basic information and the like. In addition, since the seller can visualize the operation information 12 and display it to the customer without waiting for improvement of selling skills, the seller can provide various proposals to the customer.

In addition, the operation information of the report format shown in FIG. 9 is editable, numbers can be input assuming that a new image output apparatus having a predetermined print speed is purchased. Since the operation information providing apparatus displays graphs shown in FIGS. 9-12 based on input numbers, one can check effects of the purchase of the new image output apparatus by the graph. That is, the operation information providing apparatus can be used as a simulator.

According to the operation information providing system in this embodiment, the apparatus information can be obtained only by connecting to the customer's network. Although the apparatus information could be obtained in the conventional technology, since the work should be interpreted when the image output apparatus is being used, it was actually difficult to obtain apparatus information from all image output apparatuses for each floor. Especially, when the number of image output apparatuses owned by the customer is large, inconvenient matters increases.

By using the apparatus information obtaining apparatus, the apparatus information can be obtained in a short time, and the work for obtaining can be performed with the customer (the customer witnesses the work). Therefore, fears on the customer's information leakage can be eliminated. Since information items stored in the MIB are predetermined, information items having a possibility to be leaked can be minimized.

In addition, according to this embodiment, based on the obtained apparatus information 11, the operation information providing apparatus obtains the apparatus basic information of the apparatus basic information DB 10 or the customer information of the customer information DB. Conventionally, there is a case in which purchase time of a machine, price, and maintenance cost per month for each image output apparatus are obtained using customer's payment slips, or when the payment slips do not exist, these are obtained by hearings. However, such work takes much time. In contrast, like this embodiment, by using the apparatus basic information DB or the customer information DB, time for such work can be largely decreased.

In addition, calculation of the operation ratio and the like based on the apparatus basic information takes much time conventionally. In contrast, according to this embodiment, time and work loads can be decreased. In addition, the obtained operation information 12 can be automatically and visually displayed using a graph. By visualizing ununderstandable information of the apparatus information 11 or the operation information 12, it becomes possible to provide operation status of the image output apparatus in an easily-understandable format. In addition, in this embodiment, since the operation information 12 is statistically dealt with, the larger the number of the image output apparatuses is, the larger the effect obtained by the operation information providing apparatus is.

Generally, an operation ratio is obtained by dividing a mean down time (average continuous operation time) by sum of the mean down time and a mean recovery time. However, according to the operation ratio calculated in this way, it cannot be determined whether an image output apparatus is actually used. In contrast, by defining the operation ratio in the way described in this embodiment, an actually used ratio against printing ability of the image output apparatus can be calculated. Therefore, as shown in FIG. 10A, relationship between the operation ratio and the use period, that could not be displayed conventionally, can be displayed as a graph.

By visualizing the operation information, TCO reduction can be addressed based on the same understanding of the seller and the customer so that replacement of image output apparatuses and new proposals can be considered. Conventionally, interpretation and description of the operation information requires high skills. In contrast, according to this embodiment, selling activities proposing TCO reduction can be easily carried out.

The customer and the seller can decrease complicated works for managing the operation information. In addition, the customer can ascertain inherent cost on the image output apparatus. Even when the customer cannot ascertain the inherent cost, the customer can achieve cost reduction in the short view based on a seller's proposal, and the customer can strategically determine intra-company rules on placement and usage of image output apparatuses in the long view.

In addition, effective TCO proposal was difficult depending on seller's individual business skill. However, by using the operation information providing apparatus, unification of TCO proposal process can be realized so that proposal activities to customers who have not been contacted can be realized.

In addition, since the operation information 12 can be provided by using the apparatus information obtaining apparatus 8 and the operation information providing apparatus 9, the seller can provide the customer with the operation information 12 periodically. Conventionally, it was difficult to provide the operation information 12 periodically especially when the number of the image output apparatus is large. However, according to this embodiment, by providing the operation information 12 periodically, effects caused by a case in which TCO reduction is performed without replacement of the image output apparatus can be checked. If TCO cannot be improved without replacement of the image output apparatus, the customer and the seller can plan optimum placement based on the operation information 12. In addition, after optimum placement is performed by replacing the image output apparatus, feedback of the result of the optimum placement can be obtained by providing the operation information 12 periodically.

In addition, the seller can ascertain tendencies according to attributes of customers by storing the operation information 12 of plural customers. For example, by ascertaining high/low of print cost and tendencies of the operation information 12 according to attributes such as size, type of industry, businesses and the like of the customer, the seller can propose an accurate TCO reduction plan to a new customer.

Second Embodiment

In the first embodiment, the system 1 in the customer's side obtains the apparatus information, and the system 2 in the seller's side provides the operation information. In this second embodiment, an operation information providing apparatus for performing processes from obtaining the apparatus information to providing the operation information in the system 1 in the customer's side is described.

Figure 13:
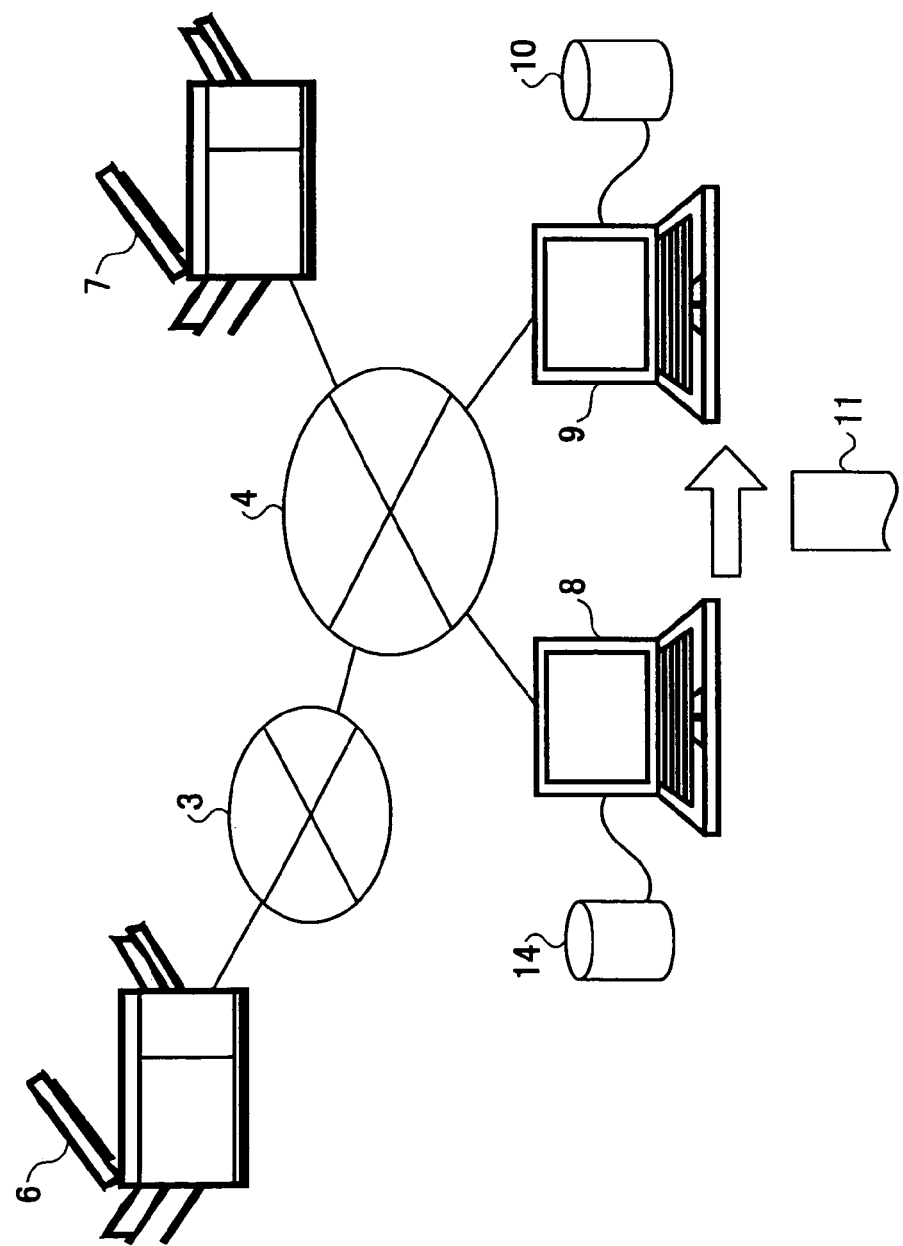
FIG. 13 shows an example of a configuration of an operation information providing system in an second embodiment.

FIG. 13 shows an example of a configuration of an operation information providing system for displaying the operation information of the image output apparatus. In FIG. 13, same reference numerals are assigned to corresponding components in FIG. 1. The operation information providing system shown in FIG. 13 is different from the system shown in FIG. 1 in that the operation information providing apparatus 9 is connected to the system 1 of the customer's side. In addition, the operation information providing apparatus 9 is configured to include the apparatus basic information DB 10.

Therefore, the apparatus information 11 obtained by the apparatus information obtaining apparatus 8 is sent to the operation information providing apparatus 9 via the network 4. The apparatus information 11 can be directly sent to the operation information providing apparatus 9 without using the network. In addition, the apparatus information 11 may be input to the operation information providing apparatus 9 via a recording medium such as a memory card. In addition, the apparatus information obtaining apparatus 8 and the operation information providing apparatus 9 can be integrated as one machine. In addition, the apparatus basic information DB 10 may be connected to the network in the seller's side via the Internet in the same way as the first embodiment.

The hardware configuration of each of the apparatus information obtaining apparatus 8 or the operation information providing apparatus 9, and information in each of the image output apparatus list 14, the apparatus basic information DB 10, the customer information DB and the apparatus information 11 are the same as those in the first embodiment.

Figure 14:
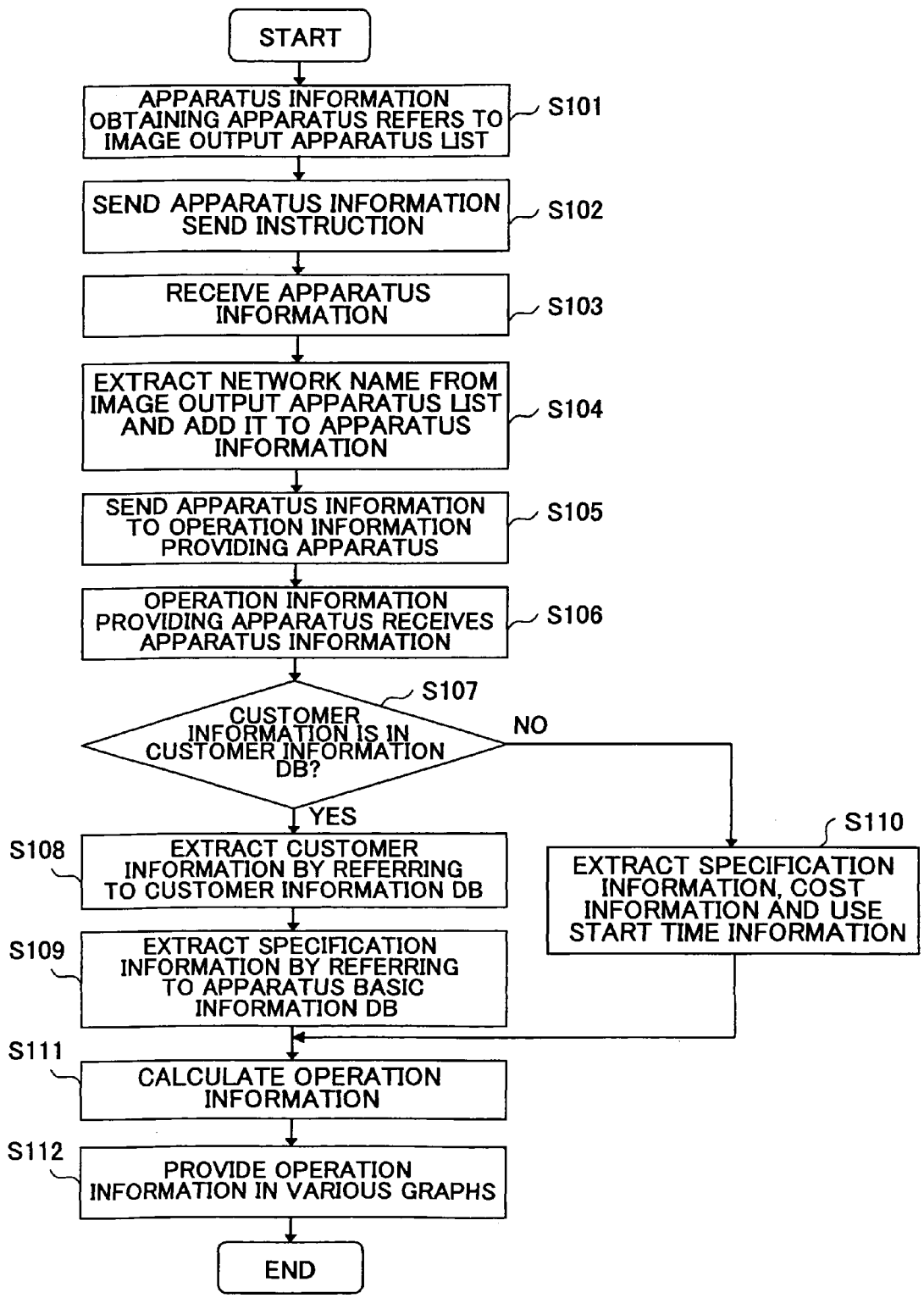
FIG. 14 is a flowchart showing a process flow from the time when the apparatus information obtaining apparatus obtains the apparatus information to the time when the operation information providing apparatus provides the operation information.

FIG. 14 is a flowchart showing a process flow from the time when the apparatus information obtaining apparatus 8 obtains the apparatus information to the time when the operation information providing apparatus 9 provides the operation information. First, the image output apparatus list referring unit refers to the image output apparatus list 14 so as to extract an IP address of the image output apparatus from which the apparatus information is obtained in step S101. When the IP address is extracted, the apparatus information send instruction sending unit sends an apparatus information send instruction to the image output apparatus of the IP address in step S102. The image output apparatus that receives the apparatus information send instruction sends the apparatus information 11 corresponding to the send instruction to the apparatus information obtaining apparatus 8.

The apparatus information receiving unit receives the apparatus information from each image output apparatus in step S103. The apparatus information obtaining apparatus 8 extracts placement location information such as network name and floor and adds the information to the apparatus information in step S104. Accordingly, the apparatus information 11 to which the placement location information is added is generated. In the first embodiment, encryption for the apparatus information 11 is performed next. However, in this embodiment, since the customer side provides the operation information, encryption is not necessary. The apparatus information sending unit sends the apparatus information to the operation information providing apparatus 9 in step S105.

Since processes after that are the same as those of the first embodiment, only outlines of the processes after that are described. The apparatus information inputting unit of the operation information providing apparatus 9 inputs the apparatus information 11 received from the apparatus information obtaining apparatus 8 in step S106. The apparatus basic information extracting unit determines whether the customer information DB includes expense information or purchase year and month of the image output apparatus using "Serial Number" and the like as a key in step S107. When the customer information DB includes the expense information or the purchase year and month (Y in step S107), the apparatus basic information extracting unit extracts these items of information in step S108. In addition, next, the apparatus basic information extracting unit refers to the apparatus basic information DB so as to extract specification information of the print speed (PPM) and the like in step S109.

When the customer information DB does not include the expense information or the purchase year and month (N in step S107), the apparatus basic information DB 10 is referred to so as to extract use start time information, specification information and cost information of each image output apparatus in step S110.

When the specification information, expense information or cost information, and purchase year and date or the use start time information are extracted, the operation cost calculating unit and the like calculates an operation cost, an operation ratio and a use period in step S111. The calculated result is visualized and displayed in various formats like the first embodiment in step S112.

According to this embodiment, since the operation information 12 can be output from obtained apparatus information in the customer side, the fear that the apparatus information may be leaked to the outside is reduced. Thus, the customer can easily cooperate with works for providing the operation information 12. In addition, when the customer information DB does not include customer information, since information on the purchase price or the purchase time can be obtained from the customer by hearing at the location, more accurate operation information can be provided.

As mentioned above, an apparatus information obtaining apparatus for obtaining apparatus information including model information of an image output apparatus from the image output apparatus via a network is described. The apparatus information obtaining apparatus includes: an image output apparatus list database storing a list of image output apparatuses from which the apparatus information is obtained; an apparatus information send instruction sending unit for instructing the image output apparatus included in the image output apparatus list to send the apparatus information; and an apparatus information receiving unit for receiving the apparatus information from the image output apparatus that is instructed to send the apparatus information.

In addition, an operation information providing apparatus for providing operation information on operation status of an image output apparatus based on apparatus information including model information and print number information of the image output apparatus is described, which includes: an apparatus basic information database storing model information and cost information of the image output apparatus; an apparatus information inputting unit for inputting the apparatus information; an apparatus basic information extracting unit for extracting cost information of the image output apparatus by referring to the apparatus basic information database using the model information as a key; and an operation cost calculating unit for calculating print cost of the image output apparatus based on the cost information extracted by the apparatus basic information extracting unit and the print number information.

The operation information providing apparatus may further include a user information database for storing expense information on use of the image output apparatus by a user, wherein, when the user information database includes the expense information of the image output apparatus, the apparatus basic information extracting unit extracts the expense information prior to the cost information.

According to this feature, since the operation cost can be calculated using the expense information actually expensed by the user for consumable items when the expense information is stored in the user information database, the operation cost can be calculated more accurately.

In the operation information providing apparatus, the apparatus basic information database may further include specification information including a print speed of the image output apparatus, and the operation information providing apparatus further includes an operation ratio calculating unit for calculating an operation ratio of the image output apparatus based on the print speed extracted by the apparatus basic information extracting unit and the print number information. Accordingly, by using the print speed, printable number per predetermined period can be calculated and the operation ratio can be calculated based on the printable number and an actual print number information.

In the operation information providing apparatus, the apparatus basic information database may further include use start time information used for calculating a use period of the image output apparatus, and the operation information providing apparatus may further includes: an use period calculating unit for calculating the use period of the image output apparatus based on the use start time information extracted by the apparatus basic information extracting unit; and an operation information displaying unit for displaying relationship between the operation ratio and the use period in a graph format. Therefore, since the operation ratio and the use period can be displayed in a graph format, the operation information can be visually ascertained.

In the operation information providing apparatus, the user information database may further include an region for recording purchase year and month when the user of the image output apparatus purchased the image output apparatus, and when the user information database includes the purchase year and month of the image output apparatus, the apparatus basic information extracting unit may extract the purchase year and month prior to the use start time information. According to this configuration, when the user information database includes the purchase year and month when the user actually purchased the image output apparatus, the use period is calculated using the purchase year and month so that the use period can be calculated more accurately.

In the operation information providing apparatus, the apparatus basic information database and/or the user information database may be connected to the operation information apparatus via the network. Therefore, if the operation information providing apparatus does not include the apparatus basic information database and/or the user information database, the operation information providing apparatus can access the apparatus basic information database and/or the user information database via the network.

The present embodiment can be also described as an apparatus information obtaining method for obtaining apparatus information including model information of an image output apparatus from the image output apparatus via a network, comprising: an image output apparatus list database referring step of referring to an image output apparatus list database storing a list of image output apparatuses from which the apparatus information is obtained; an apparatus information send instruction sending step of instructing the image output apparatus included in the image output apparatus list to send the apparatus information; and an apparatus information receiving step of receiving the apparatus information from the image output apparatus that is instructed to send the apparatus information.

In addition, the present embodiment can be also described as an operation information providing method for providing operation information on operation status of an image output apparatus based on apparatus information including model information and print number information of the image output apparatus, comprising: an apparatus information inputting step of inputting the apparatus information; an apparatus basic information extracting step of extracting cost information of the image output apparatus by referring, using the model information as a key, to an apparatus basic information database storing model information and cost information of the image output apparatus; and an operation cost calculating step of calculating print cost of the image output apparatus based on the cost information extracted by the apparatus basic information extracting step and the print number information.

In addition, the present embodiment can be also described as an operation information providing program for causing a computer to provide operation information on operation status of an image output apparatus based on apparatus information including model information and print number information of the image output apparatus, comprising: apparatus information inputting program code means for inputting the apparatus information; apparatus basic information extracting program code means for extracting, using the model information as a key, cost information of the image output apparatus by referring to an apparatus basic information database storing model information and cost information of the image output apparatus; and operation cost calculating program code means for calculating print cost of the image output apparatus based on the cost information extracted by the apparatus basic information extracting program code means and the print number information.

In addition, the present embodiment can be also described as an operation information providing apparatus for providing operation information on operation status of an image output apparatus connected via a network, comprising: an apparatus basic information database storing model information and cost information of the image output apparatus; an apparatus information obtaining unit for obtaining apparatus information including the model information and print number information from the image output apparatus; an apparatus basic information extracting unit for extracting the cost information of the image output apparatus by referring to the apparatus basic information database using the model information as a key; and an operation cost calculating unit for calculating print cost of the image output apparatus based on the cost information extracted by the apparatus basic information extracting unit and print number information.

In addition, the present embodiment can be also described as a computer program for causing a computer to provide operation information on operation status of an image output apparatus connected via a network, the computer program comprising: apparatus information obtaining program code means for obtaining apparatus information including model information and print number information from the image output apparatus; apparatus basic information extracting program code means for extracting, using the model information as a key, the cost information of the image output apparatus by referring to an apparatus basic information database storing model information and cost information of the image output apparatus; operation cost calculating program code means for calculating print cost of the image output apparatus based on the cost information extracted by the apparatus basic information extracting program code means and the print number information.

The present invention is not limited to the specifically disclosed embodiments, and variations and modifications may be made without departing from the scope of the present invention.

The present application contains subject matter related to Japanese patent application No. 2004-270321, filed in the JPO on Sep. 16, 2004, the entire contents of which are incorporated herein by reference.

What is claimed is:

1. A system for obtaining apparatus information and providing operation information, comprising:
   an apparatus information obtaining apparatus configured to obtain apparatus information from an image output apparatus via a network, the apparatus information including first model information and print number information of the image output apparatus, the apparatus information obtaining apparatus including,
      an image output apparatus list database storing a list of image output apparatuses from which the apparatus information is obtained, an apparatus information send instruction sending unit configured to instruct one of the image output apparatuses included in the image output apparatus list to send the apparatus information after an IP address associated with the image output apparatus is extracted from the list of image output apparatuses, and an apparatus information receiving unit configured to receive the apparatus information from the image output apparatus that is instructed to send the apparatus information, an operation information providing apparatus including, an apparatus information inputting unit configured to receive the apparatus information, an apparatus basic information database storing second model information of the image output apparatus, specification information, and use start time information, the specification information including a print speed of the image output apparatus, and the use start time information being used for calculating a use period of the image output apparatus, an apparatus basic information extracting unit configured to extract the print speed of the image output apparatus by referring to the apparatus basic information database using the first model information as a key, an operation cost calculating unit configured to calculate an operation ratio of the image output apparatus based on the print speed extracted by the apparatus basic information extracting unit and the print number information, a use period calculating unit configured to calculate the use period of the image output apparatus based on the use start time information extracted by the apparatus basic information extracting unit, and an operation information displaying unit configured to display a relationship between the operation ratio and the use period in a graph showing points each indicating a set of the operation ratio and the use period, wherein the operation information displaying unit divides the graph into a plurality of regions including a region in which the operation ratio is in a first operation range, a region in which the operation ratio is lower than the first operation range and the use period is a first period, and a region in which the operation ratio is lower than the first operation range and the use period is longer than the first period, wherein the IP address associated with the image output apparatus is extracted at a predetermined timing or in response to a start instruction of processing.

2. An operation information providing apparatus for providing operation information on an operation status of an image output apparatus based on apparatus information, the apparatus information including first model information and print number information of the image output apparatus, comprising:

an apparatus basic information database storing second model information of the image output apparatus, specification information, and use start time information, the specification information including a print speed of the image output apparatus, and the use start time information being used for calculating a use period of the image output apparatus;

an apparatus information inputting unit configured to receive the apparatus information;

an apparatus basic information extracting unit configured to extract the print speed of the image output apparatus by referring to the apparatus basic information database using the first model information as a key;

an operation cost calculating unit configured to calculate an operation ratio of the image output apparatus based on the print speed extracted by the apparatus basic information extracting unit and the print number information;

a use period calculating unit configured to calculate the use period of the image output apparatus based on the use start time information extracted by the apparatus basic information extracting unit; and an operation information displaying unit configured to display a relationship between the operation ratio and the use period in a graph showing points each indicating a set of the operation ratio and the use period, wherein the operation information displaying unit divides the graph into a plurality of regions including a region in which the operation ratio is in a first operation range, a region in which the operation ratio is lower than the first operation range and the use period is a first period, and a region in which the operation ratio is lower than the first operation range and the use period is longer than the first period.

3. The operation information providing apparatus as claimed in claim 2, further comprising:

a customer information database which stores expense information on use of the image output apparatus by a user, wherein after the customer information database includes the expense information of the image output apparatus, the apparatus basic information extracting unit extracts the expense information.

4. The operation information providing apparatus as claimed in claim 2, further comprising:

a customer information database which includes an region for recording purchase year and month when a user of the image output apparatus purchased the image output apparatus, wherein after the customer information database includes the purchase year and month of the image output apparatus, the apparatus basic information extracting unit extracts the purchase year and month prior to the use start time information.

5. A method for obtaining apparatus information and providing operation information, comprising:

referring, at an apparatus information obtaining apparatus, to an image output apparatus list database storing a list of image output apparatuses from which apparatus information is obtained, the apparatus information including first model information and print number information of the image output apparatus;

instructing, at the apparatus information obtaining apparatus, the image output apparatus included in the image output apparatus list to send the apparatus information after an IP address associated with the image output apparatus is extracted from the list of image output apparatuses;

receiving, at the apparatus information obtaining apparatus, the apparatus information from the image output apparatus that is instructed to send the apparatus information;

providing, at an operation information providing apparatus, second model information of the image output apparatus, specification information, and use start time information, the specification information including a print speed of the image output apparatus, and the use start time information being used for calculating a use period of the image output apparatus;

receiving, at the operation information providing apparatus, the apparatus information;

extracting, at the operation information providing apparatus, the print speed of the image output apparatus by referring, using the first model information as a key, to an apparatus basic information database storing the print speed;

calculating, at the operation information providing apparatus, an operation ratio of the image output apparatus based on the print speed extracted and the print number information;

calculating, at the operation information providing apparatus, the use period of the image output apparatus based on the use start time information; and displaying, at the operation information providing apparatus, a relationship between the operation ratio and the use period in a graph showing points each indicating a set of the operation ratio and the use period, the graph divided into a plurality of regions including a region in which the operation ratio is in a first operation range, a region in which the operation ratio is lower than the first operation range and the use period is a first period, and a region in which the operation ratio is lower than the first operation range and the use period is longer than the first period, wherein the IP address associated with the image output apparatus is extracted at a predetermined timing or in response to a start instruction of processing.

6. An operation information providing method, implemented on an operation information providing apparatus, for providing operation information on an operation status of an image output apparatus based on apparatus information, the apparatus information including first model information and print number information of the image output apparatus, comprising:

providing second model information of the image output apparatus, specification information, and use start time information, the specification information including a print speed of the image output apparatus, and the use start time information being used for calculating a use period of the image output apparatus;

receiving, at the operation information providing apparatus, the apparatus information;

extracting, at the operation information providing apparatus, the print speed of the image output apparatus by referring, using the first model information as a key, to an apparatus basic information database storing the second model information of the image output apparatus;

calculating, at the operation information providing apparatus, an operation ratio of the image output apparatus based on the print speed extracted by the step of extracting and the print number information;

calculating the use period of the image output apparatus based on the use start time information; and displaying a relationship between the operation ratio and the use period in a graph showing points each indicating a set of the operation ratio and the use period, the graph divided into a plurality of regions including a region in which the operation ratio is in a first operation range, a region in which the operation ratio is lower than the first operation range and the use period is a first period, and a region in which the operation ratio is lower than the first operation range and the use period is longer than the first period.

7. The operation information providing method as claimed in claim 6, further comprising:

referring to a customer information database which stores expense information on use of the image output apparatus by a user; and extracting, after the customer information database includes the expense information of the image output apparatus, the expense information.

8. The operation information providing method as claimed in claim 6, wherein the apparatus basic information database includes the specification information.

9. The operation information providing method as claimed in claim 8, wherein the apparatus basic information database includes the use start time information.

10. The operation information providing method as claimed in claim 9, wherein a customer information database includes an region for recording purchase year and month when the user of the image output apparatus purchased the image output apparatus, and the operation information providing method further comprises:

extracting, after the customer information database includes the purchase year and month of the image output apparatus, the purchase year and month prior to the use start time information.

11. An operation information providing apparatus for providing operation information on an operation status of an image output apparatus based on apparatus information, the apparatus information including first model information and print number information of the image output apparatus, comprising:

apparatus basic information storing means for storing second model information of the image output apparatus, specification information, and use start time information, the specification information including a print speed of the image output apparatus, and the use start time information being used for calculating a use period of the image output apparatus;

apparatus information receiving means for receiving the apparatus information;

apparatus basic information extracting means for extracting, using the first model information as a key, the print speed of the image output apparatus by referring to the apparatus basic information storing means storing the second model information of the image output apparatus;

operation cost calculating means for calculating an operation ratio of the image output apparatus based on the print speed extracted by the apparatus basic information extracting means and the print number information;

use period calculating means for calculating the use period of the image output apparatus based on the use start time information extracted by the apparatus basic information extracting means; and operation information displaying means for displaying a relationship between the operation ratio and the use period in a graph showing points each indicating a set of the operation ratio and the use period, wherein the operation information displaying means divides the graph into a plurality of regions including a region in which the operation ratio is in a first operation range, a region in which the operation ratio is lower than the first operation range and the use period is a first period, and a region in which the operation ratio is lower than the first operation range and the use period is longer than the first period.

12. A non-transitory computer readable recording medium storing operation information providing instructions which, when executed by a computer having a processor, cause the processor to execute a method for providing operation information on an operation status of an image output apparatus based on apparatus information, the apparatus information including first model information and print number information of the image output apparatus, said method comprising:
providing second model information of the image output apparatus, specification information, and use start time information, the specification information including a print speed of the image output apparatus, and the use start time information being used for calculating a use period of the image output apparatus;
receiving the apparatus information;
extracting, using the first model information as a key, the print speed of the image output apparatus by referring to an apparatus basic information database storing the second model information of the image output apparatus;
calculating an operation ratio of the image output apparatus based on the print speed extracted by the step of extracting and the print number information;
calculating the use period of the image output apparatus based on the use start time information; and
displaying a relationship between the operation ratio and the use period in a graph showing points each indicating a set of the operation ratio and the use period, the graph divided into a plurality of regions including a region in which the operation ratio is in a first operation range, a region in which the operation ratio is lower than the first operation range and the use period is a first period, and a region in which the operation ratio is lower than the first operation range and the use period is longer than the first period.

13. An operation information providing apparatus for providing operation information on operation status of an image output apparatus connected via a network, comprising:
an apparatus basic information database storing second model information of the image output apparatus, specification information, and use start time information, the specification information including a print speed of the image output apparatus, and the use start time information being used for calculating a use period of the image output apparatus;
an apparatus information obtaining unit configured to obtain apparatus information including first model information and print number information from the image output apparatus;
an apparatus basic information extracting unit configured to extract the print speed of the image output apparatus by referring to the apparatus basic information database using the first model information as a key;
an operation cost calculating unit configured to calculate an operation ratio of the image output apparatus based on the print speed extracted by the apparatus basic information extracting unit and print number information;
a use period calculating unit configured to calculate the use period of the image output apparatus based on the use start time information extracted by the apparatus basic information extracting unit; and
an operation information displaying unit configured to display a relationship between the operation ratio and the use period in a graph showing points each indicating a set of the operation ratio and the use period,
wherein the operation information displaying unit divides the graph into a plurality of regions including a region in which the operation ratio is in a first operation range, a region in which the operation ratio is lower than the first operation range and the use period is a first period, and a region in which the operation ratio is lower than the first operation range and the use period is longer than the first period.

14. The operation information providing apparatus as claimed in claim 13,
wherein a customer information database stores expense information for use of the image output apparatus by a user of the image output apparatus, and
after the customer information database includes the expense information of the image output apparatus, the apparatus basic information extracting unit extracts the expense information.

15. A non-transitory computer readable storage medium encoded with instructions which when executed by a computer having a processor, cause the processor to execute a method for providing operation information on operation status of an image output apparatus connected via a network, said method comprising:
providing second model information of the image output apparatus, specification information, and use start time information, the specification information including a print speed of the image output apparatus, and the use start time information being used for calculating a use period of the image output apparatus;
obtaining apparatus information including first model information and print number information from the image output apparatus;
extracting, using the first model information as a key, the print speed of the image output apparatus by referring to an apparatus basic information database storing the second model information of the image output apparatus;
calculating an operation ratio of the image output apparatus based on the print speed extracted by the step of extracting and the print number information;
calculating the use period of the image output apparatus based on the use start time information; and
displaying a relationship between the operation ratio and the use period in a graph showing points each indicating a set of the operation ratio and the use period, the graph divided into a plurality of regions including a region in which the operation ratio is in a first operation range, a region in which the operation ratio is lower than the first operation range and the use period is a first period, and a region in which the operation ratio is lower than the first operation range and the use period is longer than the first period.

16. The system as claimed in claim 1,
wherein the apparatus information obtaining apparatus further includes an apparatus information sending unit configured to encrypt and send the apparatus information to the operation information providing apparatus.

17. The operation information providing apparatus as claimed in claim 2, wherein the apparatus information is encrypted.

18. The operation information providing apparatus as claimed in claim 2, wherein the print speed indicates a number of pages that can be printed per unit time and the print number information indicates a number of pages printed at the image output apparatus, and
the operation ratio is calculated by dividing a number of pages printed per the unit time by the print speed, the number of pages printer per the unit time being based on the print number information.

* * * * *